(12) United States Patent
    Sadikovic

(10) Patent No.: US 10,366,459 B2
(45) Date of Patent: Jul. 30, 2019

(54) METHOD AND SYSTEM FOR AGGREGATION AND CONTROL OF ENERGY GRIDS WITH DISTRIBUTED ENERGY RESOURCES

(71) Applicant: Andrija Sadikovic, San Ramon, CA (US)

(72) Inventor: Andrija Sadikovic, San Ramon, CA (US)

(*) Notice: Subject to any disclaimer, the term of this patent is extended or adjusted under 35 U.S.C. 154(b) by 707 days.

(21) Appl. No.: 14/885,374

(22) Filed: Oct. 16, 2015

(65) Prior Publication Data

US 2017/0109841 A1    Apr. 20, 2017

(51) Int. Cl.
    *G06Q 50/06*    (2012.01)
    *G05F 1/66*     (2006.01)
    *G06Q 30/02*    (2012.01)

(52) U.S. Cl.
    CPC ............... *G06Q 50/06* (2013.01); *G05F 1/66* (2013.01); *G06Q 30/0206* (2013.01); *Y04S 50/14* (2013.01)

(58) Field of Classification Search
    CPC ........................................................ G06Q 50/06
    See application file for complete search history.

(56) References Cited

U.S. PATENT DOCUMENTS

| | | | |
|---|---|---|---|
| 8,400,022 B2 | 3/2013 | Joannopoulos et al. | |
| 8,401,709 B2 | 3/2013 | Cherian et al. | |
| 8,849,715 B2 | 9/2014 | Forbes | |
| 2011/0106321 A1* | 5/2011 | Cherian | H02J 3/00 700/286 |
| 2013/0226538 A1* | 8/2013 | Donde | G06F 17/10 703/2 |
| 2014/0114844 A1* | 4/2014 | Forbes, Jr. | G05D 17/00 705/39 |
| 2014/0214219 A1* | 7/2014 | Katayama | G06Q 50/06 700/291 |
| 2014/0257584 A1* | 9/2014 | Tanimoto | G06Q 50/06 700/291 |
| 2014/0281645 A1* | 9/2014 | Sen | G06O 50/06 713/340 |
| 2015/0039145 A1 | 2/2015 | Yang et al. | |
| 2015/0278410 A1* | 10/2015 | Kumar | G01R 19/2513 703/2 |

FOREIGN PATENT DOCUMENTS

| | | |
|---|---|---|
| CN | 202167857 | 3/2012 |
| WO | 2007065135 A2 | 6/2007 |
| WO | 2014087539 A1 | 6/2014 |

OTHER PUBLICATIONS

Hayes et al. State Estimation Techniques for Electric Power Distribution Systems. Jul. 2015 (Year: 2015).*

(Continued)

*Primary Examiner* — Kurtis Gills
(74) *Attorney, Agent, or Firm* — Burns & Levinson LLP; Orlando Lopez

(57) ABSTRACT

Method and systems for aggregation and control of energy grids including distributed energy resources are disclosed. The method and system disclosed use the intelligence available in the information data network, and avoid dependence on the utility/system operator operational data network.

16 Claims, 10 Drawing Sheets

(56) References Cited

OTHER PUBLICATIONS

Handschin et al., Bad Data Analysis for Power System State Estimation IEEE Transactions on Parer Apparatus and Systems, vol. PAS-94, No. 2, Mar.-Apr. 1975.
Mili et al., Hypothesis Testing Identification: A New Method for Bad Data Analysis in Power System State Estimation IEEE—Transaction on Power Apparatus and Systems, vol. PAS-103; No. 11, Nov. 1984.
Caramanis et al., Optimal Spot Pricing: Practice and Theory IEEE Transactions on Power Apparatus and Systems, vol. PAS-101, No. 9 Sep. 1982.
Erwin Enrique Fetzer Observability in the state estimation of power systems Iowa State University Digital Repository @ Iowa State University 1972.
State Estimation, Iowa State, http://home.eng.iastate.edu/~jdm/ee553/SE1.pdf, 2012.
Meliopoulos et al. Power System State Estimation: Modeling Error Effects and Impact on System Operation Proceedings of the 34th Hawaii International Conference on System Sciences—2001.
State Estimation 2, http://home.eng.iastate.edu/~jdm/ee553/SE2.pdf, 2012.
Zhang et al., A Local Control Approach to Voltage Regulation in Distribution Networks, 2013.
Monticelli et al., Electric Power System State Estimation Proceedings of the IEEE, vol. 88, No. 2, Feb. 2000 0018-9219/00$10.00 © 2000 IEEE.
Chen et al., State Estimation and Power Flow Analysis of Power Systems Journal of Computers, vol. 7, No. 3, Mar. 2012.
Michael Caramanis, Fred C. Schweppe, and Richard D. Tabors, Tabors Spot Pricing and Its Relation to Other Load Management Methods, MIT Energy Laboratory Report MIT-EL 83-001, Jan. 1983.
International Preliminary Report on Patentability (IPRP) in related international application No. PCT/US16/52582 dated Apr. 27, 2018.
International Search Report and Written Opinion in related PCT Application No. PCT/US2016/052582, dated Dec. 7, 2016.
Hayes et al., "State Estimation Techniques for Electric Power Distribution Systems" https://www.researchgate.net/publication/283735195_State_Estimation_Techniques_for_Electric_Power_Distribution_Systems, Jul. 2015.
Supplementary European Search Report and Search Opinion issued for European Application No. 16855923.5 dated May 22, 2019.

\* cited by examiner

METHOD AND SYSTEM FOR AGGREGATION AND CONTROL OF ENERGY GRIDS WITH DISTRIBUTED ENERGY RESOURCES

BACKGROUND

These teachings relate generally to power grid control, and, more particularly, to control of grid of Distributed Energy Resources.

The deployment of Distributed Energy Resources (DERs) is growing and has an impact on electric utility distribution networks. While DERs are increasing the volume of available energy resources with their multitude of benefits, further work is needed to assure successful management of a diverse and distributed energy mix.

The growing deployment of DERs leads to an electrical system that requires coordinated control functions that are more distributed than centralized. The growing deployment of DERs requires new energy markets operating at real-time supply and demand decision points.

Existing and emerging optimal power flow solutions, finding an operating point of the power system that minimizes a cost function, rely on information from both the utility operational control networks and information technology networks. In the traditional power grid the power flow problem is typically solved by centralized solvers that collect all the necessary field data, compute the optimal configuration, and dispatch the power production to the generators. However this approach is not practical in the distribution grids with distributed DERs, due to the frequent variability of the local grid conditions, to the poor prediction on distributed generators energy offer and consumer demand, and to the fact that generators can unexpectedly connect or disconnect. There is also cost, complexity, and dependency in relying on the utilities as monopolies to effectively execute unfavorable market based energy trade economy among DERs.

In order to cost-efficiently utilize large volumes and numbers of DERs on the existing grid infrastructure, the power grid needs to embrace new methods of grid control, capable of operating independently of utility operational systems.

Therefore, a solutions should not rely on data from the utility operational control networks, but only rely on data from the utility and/or non-utility information technology networks.

BRIEF SUMMARY

Method and systems for aggregation and control of energy in power grids including distributed energy resources are provided herein below. The method and system provided herein below use the intelligence available in the information data network, and avoid dependence on the utility/system operator operational data network.

In one or more embodiments, the method of these teachings for obtaining a power flow solution for a first level network including distributed energy resources includes (a) acquiring measurements from the number of sensors distributed up to an edge of the first level network, the measurements comprising current, voltage, active power, reactive power, control mode and data of interconnectivity, the data not including data from utility operational networks, the utility operational networks including substations and circuit switches, (b) obtaining observability metrics from the measurements, (c) determining whether the first level network is observable, (d) determining, when the first level network is not observable, whether additional measurements are available, (e) acquiring, when additional measurements are available, the additional measurements and repeating steps (b)-(d), (f) receiving, when additional measurements are not available, pseudo-measurements based on recently acquired measurements in order to render the first level network observable, the pseudo-measurements being defined by a first level supervisory subsystem, (g) performing, when the first level network is observable, state estimation, (h) detecting and identifying, after the state estimation, had data, (i) receiving a determination, resulting from the had data, of whether a new state estimation is required; determination of whether a new state estimation is required is performed by the first level supervisory subsystem, (j) repeating steps (a)-(i) when the new state estimation is required, and (k) determining, when the new state estimation is not required, distributed power flow for the first level network.

In one or more embodiments, the method of these teachings for aggregation of a network, the network comprising a number of first level networks, each first level network including distributed energy resources and sinks, includes receiving at each of a number of first level supervisory subsystems, distributed power flow a first level network, the distributed power flow obtained by the method disclosed hereinabove, determining, at each of the number of first level supervisory subsystems, a price clearance for the first level network, determining, at each of the number of first level supervisory subsystems, whether to recalculate distributed power flow for the first level network, determining, at each of the number of first level supervisory subsystems, whether to reinitiate a power flow solution for the first level network, and determining, at each of the number of first level supervisory subsystems, whether to request dispatch of the first level network.

In one instance, the method of these teachings for aggregation of a network also includes receiving, at one of a number of second level supervisory subsystems, the distributed power flow for the first level network from at least two of the number of first level supervisory subsystems, determining, from the distributed power flow for at least two first level networks, at the one of the number of second level supervisory subsystems, power flow parameters at a node corresponding to said one of the number of second level supervisory subsystems, and deciding, at the one of the number of second level supervisory subsystems, whether to reinitiate distributed power flow calculations on the number of first level supervisory subsystems, the decision of whether to reinitiate distributed power flow calculation based on whether errors exceed a predetermined tolerance.

In another instance, the method of these teachings for aggregation of a network also includes providing, to a junction point supervisory subsystem, distributed power flow information from two lower level supervisory subsystems, each lower-level supervisory subsystem being one of an intermediate level supervisory subsystem or a second level supervisory subsystem, a junction point being a network logic point, performing, at the junction point supervisory subsystem, state estimation in order to reduce errors, and analyzing, at the junction point supervisory subsystem, grid edge measurements, the grid edge measurements comprising voltage fluctuations on both sides of switch nodes.

In one or more embodiments, the aggregation/supervision system of these teachings includes a number of first level supervisory subsystems and a number of second level supervisory subsystems. Each first level supervisory subsystem is configured to (a) acquire measurements from the number of sensors distributed up to an edge of a first level network, the measurements comprising current, voltage, active power, reactive power, control mode and data of interconnectivity, the data not including data from utility operational networks, the utility operational networks including substations and circuit switches, (b) obtain observability metrics from the measurements, (c) determine whether the first level network is observable, (d) determine, when the first level network is not observable, whether additional measurements are available, (e) acquire, when additional measurements are available, the additional measurements and repeating steps (b)-(d), (f) provide, when additional measurements are not available, pseudo-measurements based on recently acquired measurements in order to render the first level network observable, (g) perform, when the first level network is observable, state estimation, (h) detect and identify, after the state estimation, bad data, (i) provide a determination, resulting from the bad data, of whether a new state estimation is required, (j) repeat steps (a)-(i) when the new state estimation is required, (k) determine, when the new state estimation is not required, distributed power flow for the first level network, receive distributed power flow the first level network, determine a price clearance for the first level network, wherein determining the price clearance comprises using utility/public distribution system energy sell/buy price offerings for each subnetworks within the first level network and sell/buy price offerings for each subnetwork, determine whether to recalculate distributed power flow for the first level network, determine whether to reinitiate a power flow solution for the first level network, and determine whether to request dispatch of the first level network. Each second level supervisory subsystem is configured to receive the distributed power flow for the first level network from at least two of the number of first level supervisory subsystems, determine from the distributed power flow for at least two first level networks power flow parameters at a node corresponding to said each second level supervisory subsystems, and decide to reinitiate distributed power flow calculations, the decision of whether to reinitiate distributed power flow calculation based on whether errors exceed a predetermined tolerance.

In one instance, the aggregation/supervision system of these teachings also includes as junction point supervisory subsystem, a junction point being a network logic point. The junction point supervisory subsystem is configured to receive distributed power flow information from two lower level supervisory subsystems, each lower-level supervisory subsystem being one of an intermediate level supervisory subsystem or a second level supervisory subsystem, perform state estimation in order to reduce errors, and analyze grid edge measurements, the grid edge measurements comprising voltage fluctuations on both sides of switch nodes.

A number of other embodiments are also disclosed.

In order to cost-efficiently utilize large volumes and numbers of distributed energy resources (DERs) on to the existing grid infrastructure, the power grid needs to embrace new methods of grid control. The embodiment of these teachings outlined herein addresses this need by providing a transformational grid control architecture that performs distributed power flow calculation, distributed computation and distributed control that avoids the complexity and dependency on system integration with traditional Operational (OT) Data Network (e.g. SCADA).

As number of DERs is expected to significantly increase in the near future, the existing technologies solution architectures will demand large amount of synchronized measurements in real time, posing unachievable requirements on a utility and/or aggregator communications network infrastructure. Furthermore, dependence on both utility OT and IT data networks simply anchor these solutions to applications within utility operations, likely imposing severe limitations on implementation of a free market based economies.

Unlike existing and emerging solutions that rely on information from both the utility operational control networks and information technology networks, one embodiment of these teachings does not integrate with utility control networks. Thus, these teachings avoid the cost, complexity, and dependency of relying on the utilities as active participants in the energy trade economy. Designed for operation on large (utility) scale networks, these teachings accomplish this goal by utilizing only information available on the grid edge. The system establishes distinct network routes in order to determine the state of nodes between energy sources and sinks of interest. With that information, the distributed cloud computational engine engages the distributed power flow solution in order to determine optimal dispatch schedule for net-loads, including associated local autonomous grid edge devices control set points that support transactional objectives while supporting conservation of system parameters within allowable limits.

Operating independently from the utility OT data network, embodiments of these teachings, control of net-load provides proactive dynamic system response and shaping of net-load by taking into account net-load mutual impact, generation & load profile projections, pricing, weather data, network properties, and communications network performance. This architecture enables "plug and play" opportunities for large scale integration and utilization of DERs. In addition, in these teachings, robust power flow calculation and computation techniques are resilient to outlying measurements and/or adversarial cyber-attacks. Furthermore, the commercial solution of these teachings embraces interactive and trans-active energy economy among neighbors and communities.

For a better understanding of the present teachings, together with other and further objects thereof, reference is made to the accompanying drawings and detailed description and its scope will be pointed out in the appended claims.

DETAILED DESCRIPTION

Figure 1:
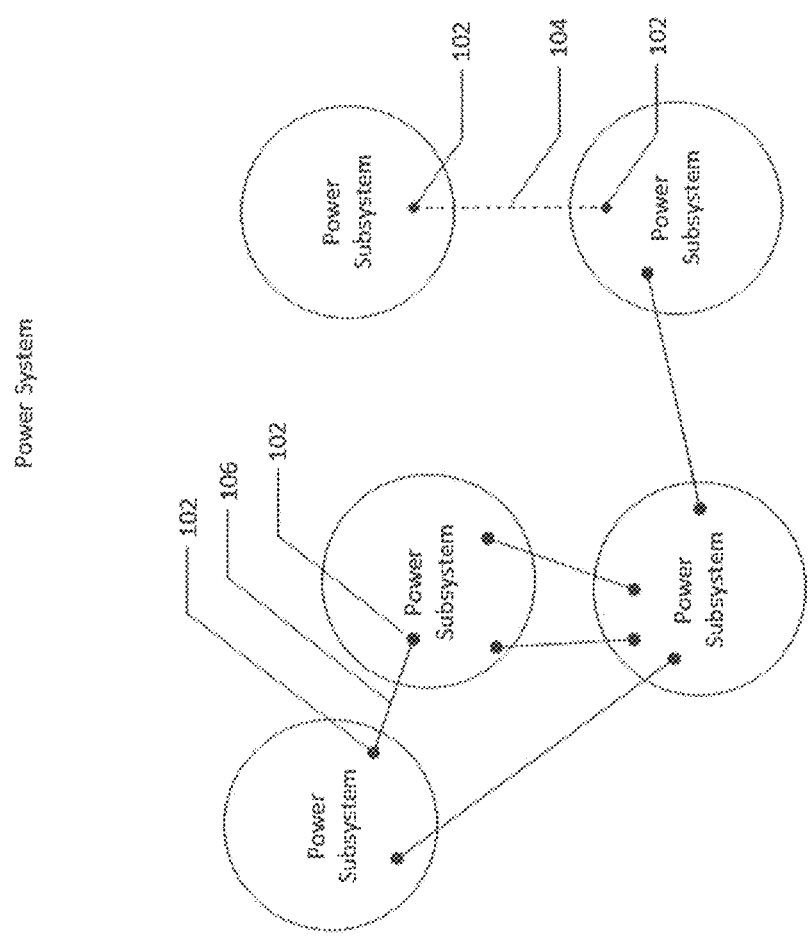
FIG. 1 depicts a portion of a power system as used in one embodiment of these teachings.

The description is not to be taken in a limiting sense, but is made merely for the purpose of illustrating the general principles of these teachings, since the scope of these teachings is best defined by the appended claims.

The above illustrative and further embodiments are described below in conjunction with the following drawings, where specifically numbered components are described and will be appreciated to be thus described in all figures of the disclosure.

As used herein, the singular forms "a," "an," and "the" include the plural reference unless the context clearly dictates otherwise.

Method and systems for aggregation and control of energy grids including distributed energy resources are provided herein below. The method and system provided herein below use the intelligence available in the information data network, and avoid dependence on the utility/system operator operational data network.

In one or more embodiments, the method of these teachings for obtaining a power flow solution for a first level network including distributed energy resources includes (a) acquiring measurements from the number of sensors distributed up to an edge of the first level network, the measurements comprising current, voltage, active power, reactive power and data of interconnectivity, the data not including data from utility operational networks, the utility operational networks including substations and circuit switches, (b) obtaining observability metrics from the measurements, (c) determining whether the first level network is observable, (d) determining, when the first level network is not observable, whether additional measurements are available, (e) acquiring, when additional measurements are available, the additional measurements and repeating steps (b)-(d), (f) receiving, when additional measurements are not available, pseudo-measurements based on recently acquired measurements in order to render the first level network observable, the pseudo-measurements being defined by a first level supervisory subsystem, (g) performing, when the first level network is observable, state estimation, (h) detecting and identifying, after the state estimation, bad data, (i) receiving a determination, resulting from the bad data, of whether a new state estimation is required; determination of whether a new state estimation is required is performed by the first level supervisory subsystem, (j) repeating steps (a)-(i) when the new state estimation is required, and (k) determining, when the new state estimation is not required, distributed power flow for the first level network.

In one or more embodiments, the method of these teachings for aggregation of a network, the network comprising a number of first level networks, each first level network including distributed energy resources, includes receiving at each of a number of first level supervisory subsystems, distributed power flow a first level network, the distributed power flow obtained by the method disclosed hereinabove, determining, at each of the number of first level supervisory subsystems, a price clearance for the first level network, determining, at each of the number of first level supervisory subsystems, whether to recalculate distributed power flow for the first level network, determining, at each of the number of first level supervisory subsystems, whether to reinitiate a power flow solution for the first level network, and determining, at each of the number of first level supervisory subsystems, whether to request dispatch of the first level network.

In one instance, the method of these teachings for aggregation of a network also includes receiving, at one of a number of second level supervisory subsystems, the distributed power flow for the first level network from at least two of the number of first level supervisory subsystems, determining, from the distributed power flow for at least two first level networks, at the one of the number of second level supervisory subsystems, power flow parameters at a node corresponding to said one of the number of second level supervisory subsystems, and deciding, at the one of the number of second level supervisory subsystems, whether to reinitiate distributed power flow calculations, the decision of whether to reinitiate distributed power flow calculation based on whether errors exceed a predetermined tolerance.

In another instance, the method of these teachings for aggregation of a network also includes providing, to a junction point supervisory subsystem, distributed power flow information from two lower level supervisory subsystems, each lower-level supervisory subsystem being one of an intermediate level supervisory subsystem or a second level supervisory subsystem, a junction point being a network logic point, performing, at the junction point supervisory subsystem, state estimation in order to reduce errors, and analyzing, at the junction point supervisory subsystem, grid edge measurements, the grid edge measurements comprising voltage fluctuations on both sides of switch nodes.

One embodiment of these teachings obtains actual data:
a) real time (current, voltage, active power, reactive power, control mode) measurement of one or more parameters taken by a plurality of sensors distributed throughout the edge of power distribution system; and
b) data of the interconnectivity of a multitude of the utility and home area network elements of the power distribution system;

One embodiment of these teachings continuously performs distributed data acquisition, distributed state estimation, distributed power flow calculation, distributed computation and distributed control across all regions where these teachings operate.

FIG. 1 depicts a portion of a power system 100 that comprises of multiple subsystems, mutually coupled via boundary energy routing mediums (ERM) such as electromagnetic resonators (104) or power lines (106). For distributed state estimation and distributed power flow calculation purposes, the boundary bus (102) is considered to belong to both coupled subsystems.

Figure 2:
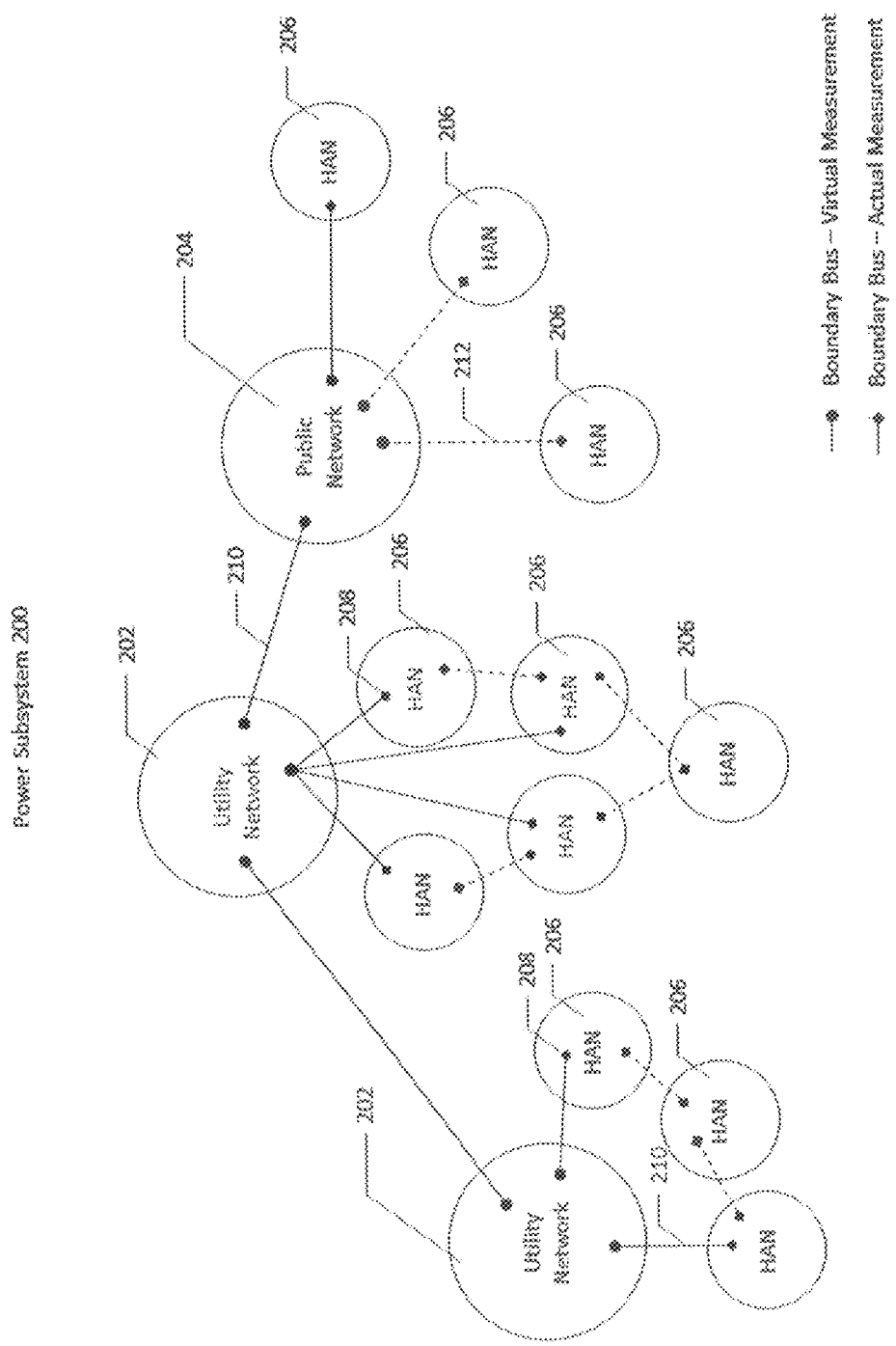
FIG. 2 depicts a subsystem as used in one embodiment of these teachings.

FIG. 2 depicts a subsystem (200) that may consist of various utility network (202) elements (UNE), public network (204) elements (PNE), home area network (206) elements (HANE), sensors (208), power lines (210) and energy routing mediums 212. For each subsystem, this embodiment of these teachings defines a number of subnetworks, starting from the very edge of the power grid with leaf networks. The subsystem size is defined based on the location of sources and sinks that participate in the energy transaction on the power grid. Therefore, the subsystem size could be as small as a leaf subnetwork or a group of interconnected neighboring leaf subnetworks, and as large as distribution substation or group of interconnected neighboring distribution substations power grid area.

Figure 3:
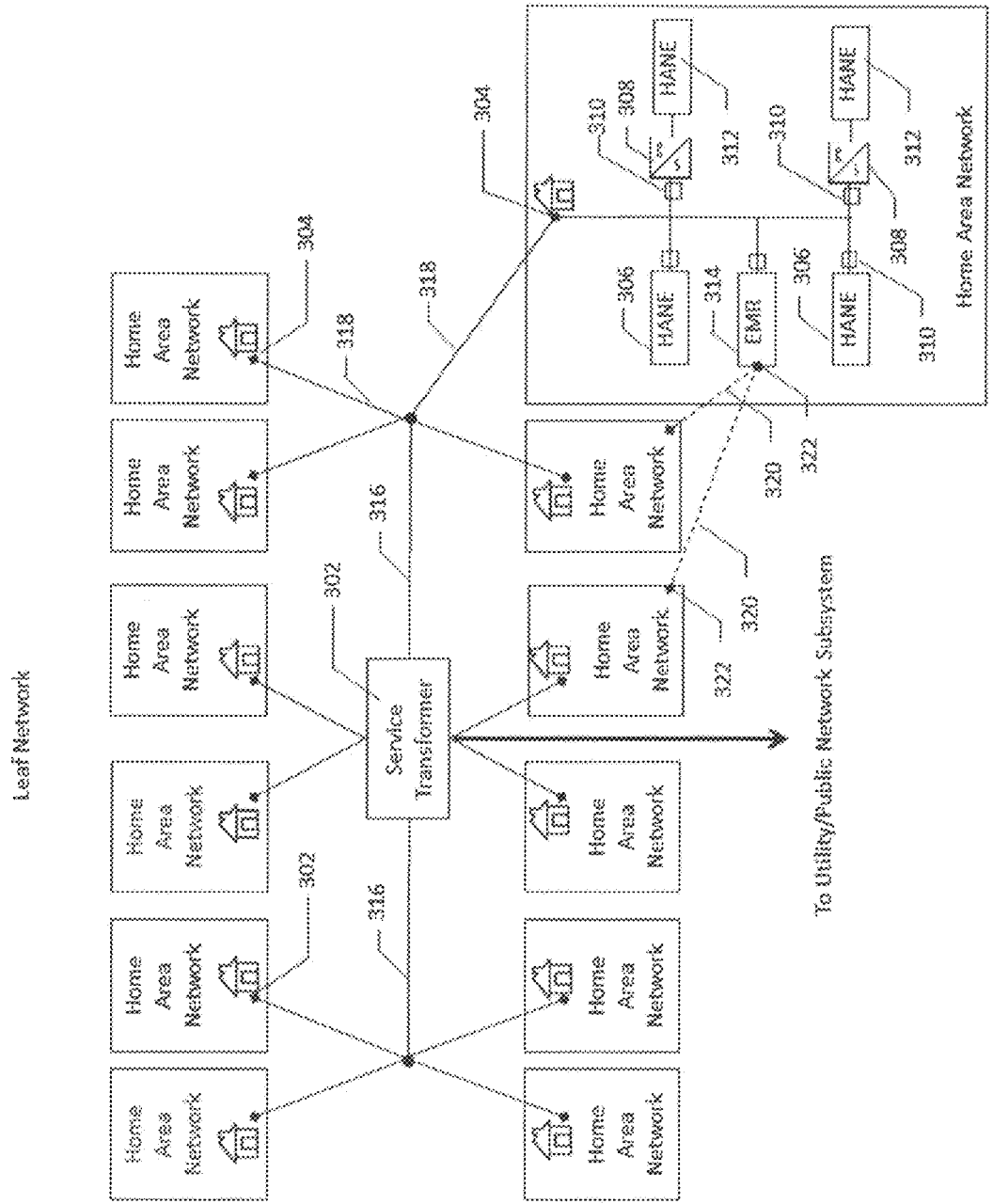
FIG. 3 depicts a leaf network as used in one embodiment of these teachings.

FIG. 3 depicts a leaf network (also referred to as a first level network) consisting of a service transformer (302) that steps down utility/public network primary medium voltage (MV) to a secondary low voltage (LV), utilized by home area networks that are fed off of that service transformer. The home area networks are connected to the utility/public power system via the secondary service power lines (316) and secondary service drop power lines (318). (The home area networks are also referred to as subnetworks within the first level network.) Home area networks could be mutually coupled with devices (314) that exchange energy via mediums other than power lines (316 and 318). We call these devices (314) electromagnetic resonators (see, for example, U.S. Pat. No. 8,400,022, which is incorporated by reference herein in its entirety and for all purposes) (EMR). The service transformer high side point is the leaf network head bus and represents the boundary bus with the higher level subnetworks. This utility/public network primary voltage side is seen as a strong source from the leaf network prospective. One embodiment of these teachings takes advantage of this weak electrical coupling by forming a number of leaf networks in each of the power subsystem.

During system operation, this embodiment of these teachings actively reaches out to the field devices for new measurements/statuses on priority basis determined by the distributed power flow solution (state estimation, calculation, computation and control) needs, as well as distribution communications network capability. One embodiment of these teachings collects measurements/data from:
1. A utility/public meter 304 at the HAN premises, including but not limited to power consumption/production and voltage at the HAN meter point.
2. A HANE meter 310 within the HAN premises, including but not limited to power consumption/production and voltage, energy capacity/demand, energy buy/sell price offer, and control mode and status of various HAN elements (306). A HANE could be a direct current (DC) source/sink, which is connected to the rest of the HANE via an (AC/DC) inverter (308).
3. An ERM meter 322 within the HAN premises, including but not limited to power export/import from the HAN via non-power line energy routing medium (320), capacity/demand, energy buy/sell price offer, and control mode and status of various HAN elements (306).

Unlike existing solutions, the embodiment of these teachings do NOT require any data from utility OT network, including substation and circuit switch position.

Figure 4:
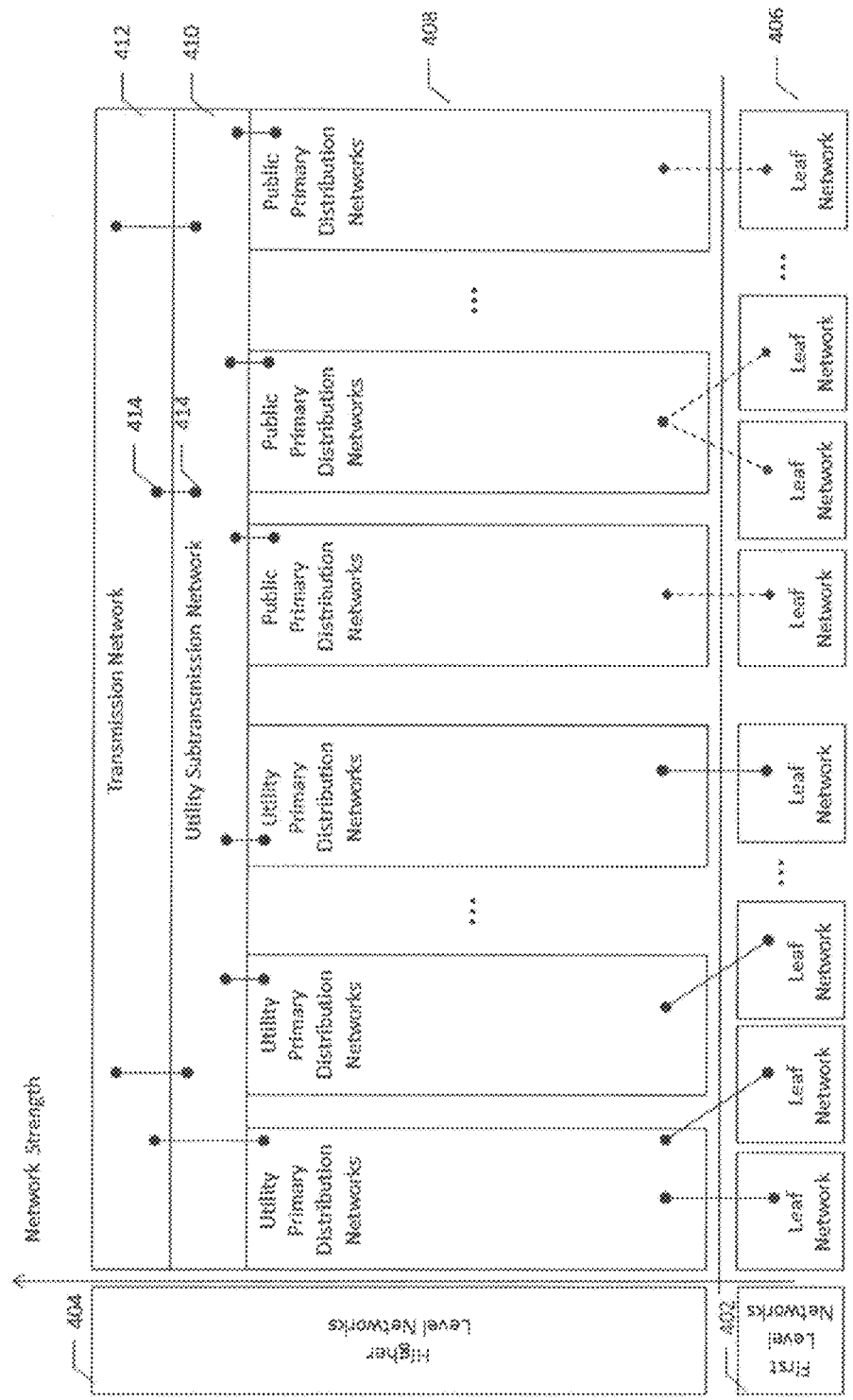
FIG. 4 depicts the (sub)network distribution scheme as in one embodiment of these teachings.

FIG. 4 depicts the distributed power flow calculation, distributed state estimation and distributed computation organization, starting with the first level networks (402) where distributed power flow solution, distributed state estimation and distributed computation are executed for each leaf network (406). For each leaf network, the head bus represents the boundary bus, which has associated parameters and states determined as part of the distributed power flow calculation, distributed state estimation and distributed computation process. For the purpose of solution aggregation in higher level networks (404), one embodiment of these teachings creates large number of higher level subnetworks in correspondence with the network electrical strength and power grid topology. Network electrical strength is determined based on the source impedance value seen from the particular point in the power grid; the higher the source impedance, the weaker electrical strength is. Utility/Public primary distribution networks are typically considered as networks in which line to line voltage under normal operating conditions is between 1000 V but less than 69 kV. Subtransmission networks (410) are considered to be networks in which line to line voltage under normal operating conditions is equal or greater to 69 kV but less than 115 kV. Transmission networks (412) are considered to be networks in which line to line voltage under normal operating conditions is 115 kV or greater.

The first (leaf network) level is managed by a distributed computing supervisory level ("supervisor"), responsible for the leaf network state observation, local state estimation, bad data detection, and if requested control execution. The second (higher) level network is managed by hierarchical supervisory levels for the purpose of power flow solution aggregation, network topology processing, task synchronization, data exchange among subnetworks, and control coordination. As mentioned above, the boundary bus (414) resides in both parent and child subnetworks.

Based on the mode of operation, system objectives, as well as geographical location, electrical distance, economic parameters, electrical parameters (e.g. power, voltage) of energy sources & sinks, the embodiment of these teachings starts the process to determine states at nodes between sources and sinks of interest, including but not limited to each subnetwork existing states and boundary points (consumption and production) capabilities. The process defines the location, schedule and frequency of measurement reads from within the leaf network meter (grid edge) points. The process of determining states at nodes of interest consists of iterative bottom-up (upstream) and top-down (downstream) distributed calculation and computation iterations until acceptable solution is reached. After states for nodes of interest are determined, the embodiment of these teachings defines dispatch/transaction schedules that meet system energy/economy objectives while securing system electrical parameters to stay within allowable limits. Both bottom-up and top-down distribution calculation and computation process might invoke a top-down and bottom-up solution distribution calculation and computation routine, respectively.

Figure 5:
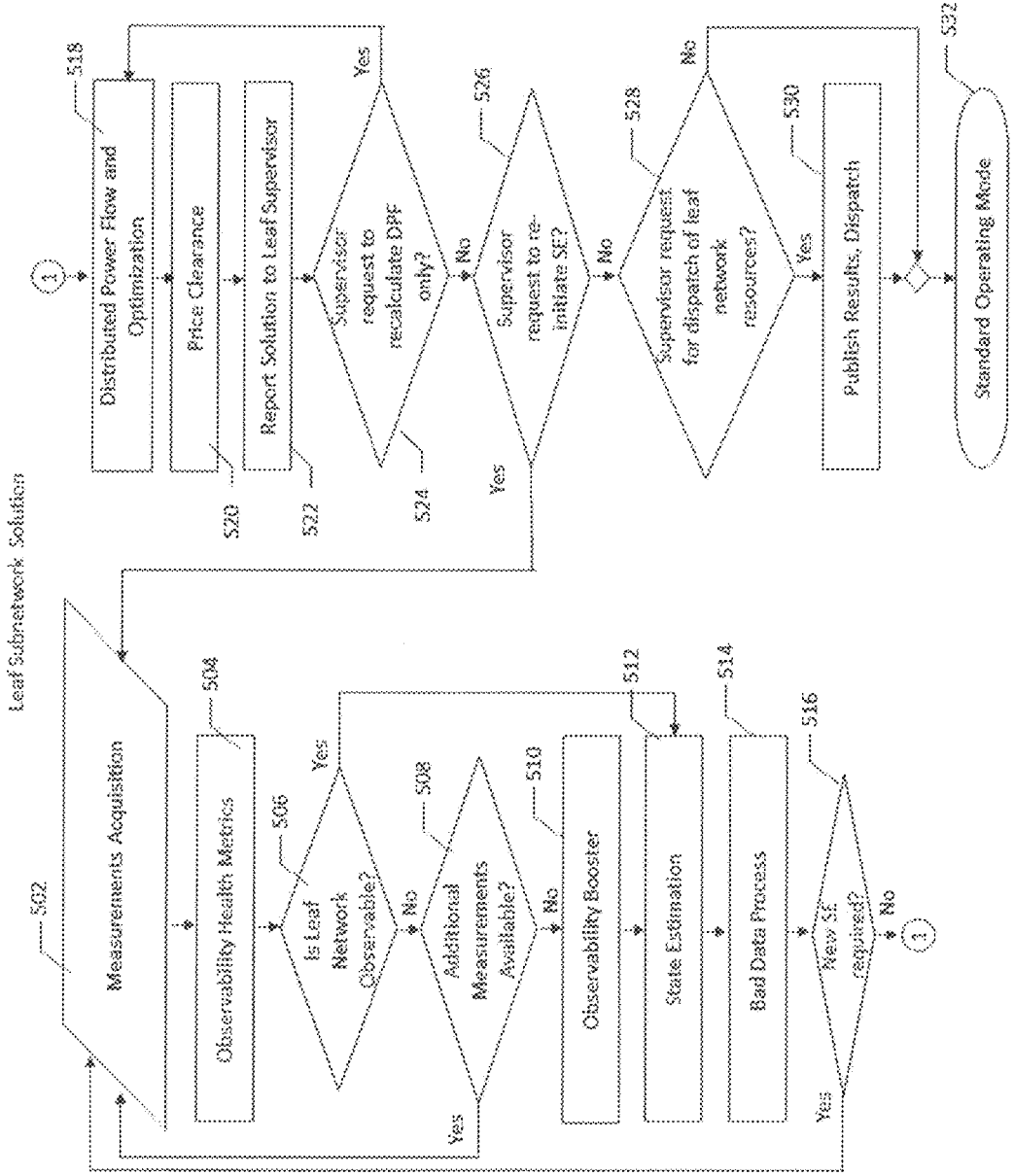
FIG. 5 depicts the leaf network distributed power flow solution process in one embodiment of these teachings.

FIG. 5 depicts the leaf network distributed power flow solution process. The initial process starts with acquisition of measurements (502). The new measurements are added to the observability health metrics (504) process for state estimation that outlines measurement design and maintains system measurement quality with time stamps when measurements were taken and/or obtained, (For observability and observability metrics see, for example, FETZER, Erwin Enrique, OBSERVABILITY IN THE STATE ESTIMATION OF POWER SYSTEMS, PhD thesis, Iowa State University, 1972, Electrical Engineering, or Utku Ilkturk, Observability Methods in Sensor Scheduling, PhD thesis, Arizona State University, 2015, both of which are Incorporated by reference herein in their entirety and for all purposes. For state estimation in power systems, see, for example, Jiaxiong Chen, Yuan Liao, State Estimation and Power Flow Analysis of Power Systems, JOURNAL OF COMPUTERS, VOL. 7, NO. 3, MARCH 2012, or Power System State Estimation: Modeling Error Effects and Impact on System Operation, Proceedings of the Hawaii International Conference On System Sciences, Jan. 3-6, 2001, Maui, Hawaii, or A. Monticelli, Electric Power System State Estimation, PROCEEDINGS OF THE IEEE, VOL. 88, NO. 2, FEBRUARY 2000, all of which are incorporated by reference herein in their entirety and for all purposes.)

Each leaf subnetwork is assigned a measurement life dynamic index that defines the probability for network states to be changed more than a given tolerance within a given time interval under given conditions. In other words, the measurement life dynamic index is used to determine whether the old measurement is considered valid or expired. Observability health metrics carries a set of observability definitions, of which one must be satisfied for the leaf subnetwork system to be considered as potentially observable. Unless acquired measurements satisfy one of the observability health metrics definitions for the state estimation need, older useful (non-expired) measurements might be used or new additional measurements might be required (508). If new measurements are obtained, observability health matrix takes newly acquired measurements and adds previously acquired (non-expired) measurements until one of the observability definitions is met. If none of the observability health metrics observability definitions are satisfied, the observability booster (510) will define pseudo measurements based on available measurements, measurement life dynamics indexes for the expired measurements, and similarity indexes, (See, for example, K. A. Clements et al., POWER SYSTEM STATE ESTIMATION WITH MEASUREMENT DEFICIENCY: AN OBSERVABILITY/MEASUREMENT PLACEMENT ALGORITHM, IEEE Transactions on Power Apparatus and Systems, Vol. PAS-102, No. 7, July 1983, which is incorporated by reference herein in its entirety and for all purposes.) The supervisors in higher level subnetworks assess historic measurements and distribution power flow solution states to define similarity indexes. The supervisory levels organize measurements based on measurement classes that consist of measurements (e.g. active or reactive power, home temperature, etc.) historically significantly similar to each other but distinct from measurements in other classes among the leaf subnetwork elements and/or all other leaf subnetworks for a given set of conditions (e.g. time of day, season). The purpose of the similarity index is for the leaf subnetwork supervisor to define pseudo measurement based on the recently acquired measurement that belongs to the same class within the same leaf subnetwork or other subnetwork on the system. The older and pseudo measurements might or might not be assigned high variances (lower weights) during the state estimation process (512). The bad data process (514) follows the state estimation process, (See, for example, E. Handschin, F. C. Schweppe, et al., BAD DATA ANALYSIS FOR POWER SYSTEM STATE ESTIMATION, IEEE Transactions on Power Apparatus and Systems, vol. PAS-94, no. 2, March/April 1975, and L. Mili et al., HYPOTHESIS TESTING IDENTIFICATION: A NEW METHOD FOR BAD DATA ANALYSIS IN POWER SYSTEM STATE ESTIMATION, IEEE-Transaction on Power Apparatus and Systems, Vol. PAS-103; No. 11, November 1984, both of which are Incorporated by reference herein in their entirety and for all purposes.) Based on what is identified as bad data, a new instructed state estimation process might be required (516). For example, if a set of new measurements is identified as bad data over older non-expired and/or pseudo measurements data, the state estimation process might be requested by the supervisor with clear instructions (e.g. adjust/reduce weights on old or pseudo measurements) how to proceed with the new state estimation process.

The distributed power flow calculation (518) takes state estimation values, sets local control modes at nodes, solves the subnetwork power flow for current dispatch and projects system conditions for a given time interval (e.g. 15 min, 1 hour, 4 hours, 24 hours), if potential violations expected or new offers/targets in place, the leaf subnetwork optimization process takes into account targeted dispatch and current schedule in order to determine optimal dispatch of leaf network resources based on economic parameters, as well as voltage and thermal constraints in place. An example of the leaf network resources could be selected HANs to participate in the energy trade auction process.

A distributed power flow calculation for the leaf subnetwork examines, determines and reports the following:

Whether existing local control modes can secure leaf subnetwork parameters to stay within allowable limits while meeting dispatch targets requested by leaf subnetworks supervisor;

If existing local control modes (e.g. Volt-VAR, Power Factor) are not capable to meet dispatch targets, determine local control modes in order to meet dispatch targets requested by leaf subnetworks supervisor while maintaining leaf subnetwork parameters within allowable limits;

Extent to which the leaf subnetwork can partially support dispatch targets while maintaining leaf subnetwork parameters within allowable limits, if dispatch targets cannot be reached; AND Leaf network energy-time (kwh) importing/exporting capacity forecast for the existing/targeting dispatch schedule and maximum leaf subnetwork (locally optimal) export/import capability for expected conditions. The import/export forecast takes into account projected attributes, including but not limited to energy consumption, energy production, pricing and weather data.

Following the distributed power flow calculation (518) for the optimal dispatch of leaf network resources and sinks, the supervisor level determines the price clearance for the energy transaction (520), if any. The distributed power flow calculation and price clearing results are reported to the leaf subnetwork supervisor (522). The results include leaf subnetwork electrical parameter values (Voltage, Angle, Active Power, and Reactive Power) and other quantities such as leaf subnetwork energy capacity/demand schedules, energy sell/buy bids, price clearance, and local status & control modes are assigned to the head bus; become virtual measurements for the solution aggregation process described in FIG. 6. Based on leaf network solution standings in all leaf networks supervised by the leaf network supervisor, the leaf subnetwork supervisor determines and informs qualified market participants of the price clearance results for each of the leaf network's for proposed leaf network energy transaction (522). Selected market participants to participate in energy transaction(s) can accept or not accept the price clearance results and schedule within the given time frame, with an option to resubmit an offer. In coordination with its supervisory level, the leaf subnetwork supervisor might or might not reinitiate parts or entire leaf subnetwork solution process with new offers from market participants that did not accept the price clearance and schedule.

The supervisor of a set of leaf subnetworks that observes one or more leaf subnetworks can instruct a new distributed power flow calculation (524)518 (e.g. change some/all control modes), instruct a new state estimation process with new data acquisition (526, 502), or initiate a new optimization problem solution (e.g. new price offering). The leaf subnetwork supervisory level might or might not be asked to publish energy trade bid selection (528) and/or dispatch/control devices (530). The leaf subnetwork supervisor maintains regular operating routines 532 (e.g. 4 hours load and generation projection based on weather updates and pricing signals) when distributed power flow calculation in leaf subnetworks is completed.

Figure 6:
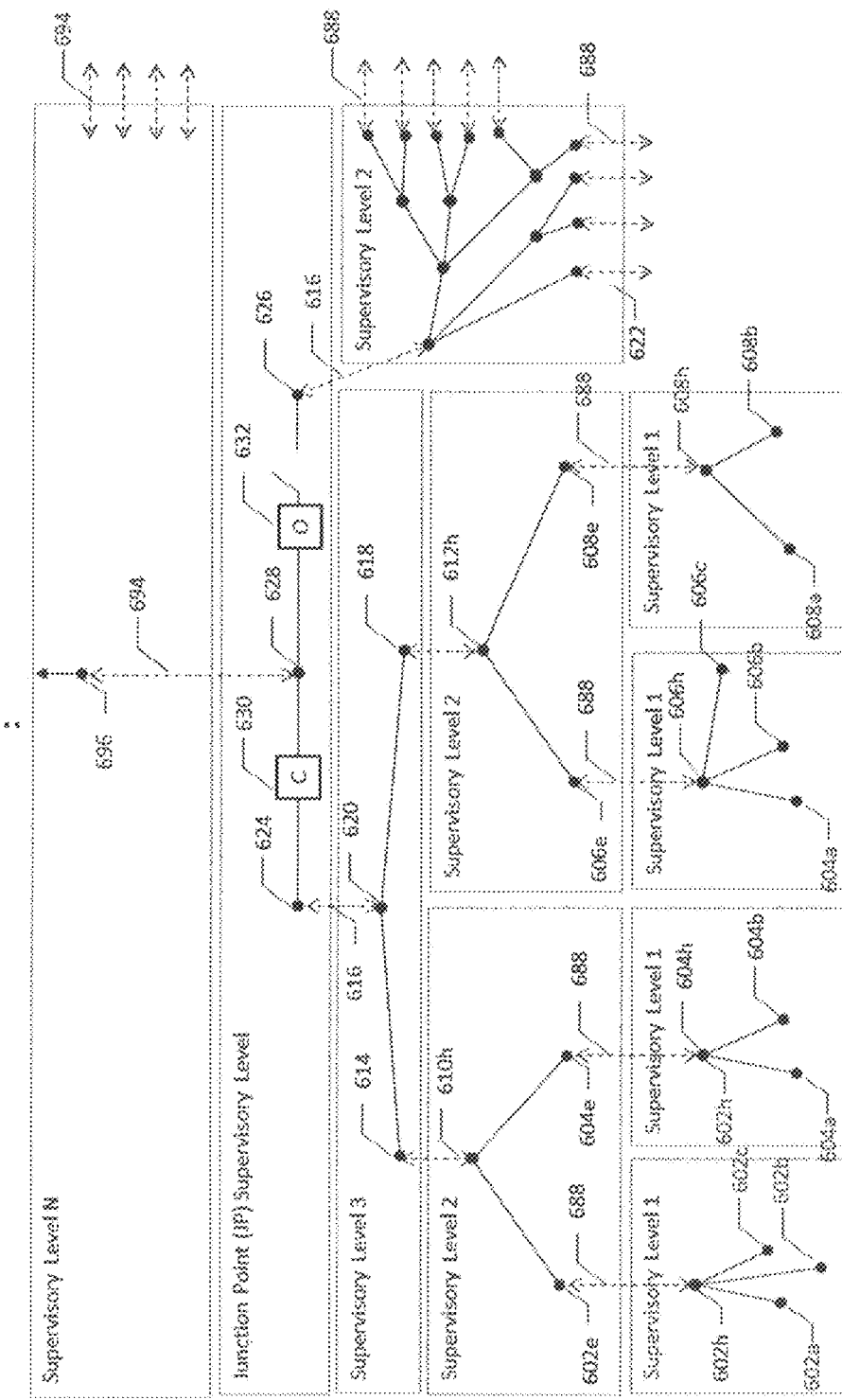
FIG. 6 depicts the distributed power flow state estimation, calculation and computation aggregation process in one embodiment of these teachings.

FIG. 6 depicts the distributed power flow state estimation, distributed calculation and distributed computation aggregation process. The solution aggregation is executed on an entire network of interest, composed of a number of subnetworks connected at boundary nodes. The subnetworks consist of 2 or more nodes. The solution aggregation process is coordinated among various supervisory levels for the purpose of power flow solution aggregation, network topology processing, task synchronization, data exchange among subnetworks, and control coordination. The distributed state estimation and distributed power flow calculation are used to determine the electrical parameters in the parent nodes based on the calculated values at the boundary nodes. In addition, the distributed state estimation process is utilized to assess the network topology/solution correctness.

The parameters of leaf subnetwork 1 head bus 602*h* are calculated based on grid edge measurement data related to HAN buses 602*a*, 602*b* and 602*c*. The parameters of leaf subnetwork 2 head bus 604*h* are calculated based on edge measurement data related to HAN buses 604*a* and 604*b*. The parameters of leaf subnetwork 3 head bus 606*h* are calculated based on edge measurement data related to HAN buses 606*a*, 606*b* and 606*c*. The parameters of leaf subnetwork 4 head bus 608*h* are calculated based on edge measurement data related to HAN buses 608*a* and 608*h*. The leaf subnetwork head bus parameter calculation continues for all required leaf subnetworks in accordance to system objective needs.

From the leaf subnetworks level perspective, the parent (Supervisory Level 2) subnetwork edge ("e") boundary nodes are assigned with the leaf subnetwork head bus parameters calculated as part of the leaf network distributed power flow state estimation, calculation and computation process. Leaf subnetwork head bus parameters become virtual edge measurements for the higher level subnetworks in the presented solution aggregation example: boundary nodes 602*e*, 604*e*, 606*e* and 608*e* parameters have identical parameters as leaf networks head bus nodes 602*h*, 604*h*, 606*h*, and 608*h*, respectively. For example, the supervisory levels 2 utilizes the distributed state estimation, distributed power flow calculation and distributed computation to determine parameters at the node 610*h* based on values in boundary nodes 602*e* and 604*e* (generically labeled 688). Similarly, with edge values 606*e* and 608*e*, another supervisory level 2 utilizes the distributed state estimation, power flow calculation and computation to determine parameters at its subnetwork head bus 612*h*. The supervisory levels (2 or higher) might reinitiate the distributed power flow calculation and computation process at some leaf network if mismatch at boundary buses exceeds the predefined tolerance. The supervisory level 3 subnetwork head bus (620) is reported (616) to the next supervisory level as a virtual grid edge measurement for the node 624. Based on needs, the higher level supervisors can consolidate the lower level supervisors. For example, existing supervisor level 2 responsible for nodes 602*e*, 604*e* and 610*h*, supervisor level 2 responsible for nodes 606*e*, 608*e*, and 612*h*, and supervisor level 3 responsible for nodes 614, 618 and 620, could be merged into one supervisory level, similar to supervisory level 2 (622). FIG. 6 demonstrates a scenario where JP supervisory level obtains its edge grid virtual measurements for node 624 from the lower level supervisory level 3 and for node 626 from lower supervisory level 2 (622).

The junction point (JP) supervisory level operates at the junction point, which is a logic point on the network (e.g. switch). The switch represents a device with two terminals (nodes). The switch position is either open (630) or close (632). Any closed switch position is interpreted as voltage magnitude and angles equal at both switch nodes. A closed switch example is demonstrated with nodes 624 and 628, both assumed to have equal voltage magnitudes and angles. Any open switch position is interpreted as zero active and reactive power flow between the switch nodes. An open switch example is demonstrated with nodes 626 and 628, assigned zero active and reactive power flow between them. This aggregation process step includes network topology assessments:

i. Calculation routine—State estimation with the objective to minimize the function contingent upon the residuals for the virtual measurements (obtained as a result of the distributed power flow state estimation, distributed calculation and distributed computation in the lower level subnetworks) and interpreted switch nodes states/positions. In the event that assumed network topology is wrong, the state estimator would not solve or, if it solves, provide large residuals as a result of the aggregation process.

ii. Logic routine—Conclusion based on the power grid edge measurements, including but not limited to voltage fluctuations patterns on both sides of the switch nodes, and deenergized states within subnetworks between one or more neighboring switching points.

The JP supervisory level virtual edge measurements (624) are reported as lower supervisory level head bus (620) parameters. The JP supervisory level performs the distributed state estimation and/or distributed power flow calculation with device (e.g. switch) statuses "as is" or assumed. The solution that matches the tolerance is then used to assign parameters to the JP subnetwork head bus (628), which is then reported/linked (694) to the next supervisory level. The solution mismatch requires distributed calculation and distributed computation re-initiation and coordination with the lower and/or higher supervisory levels. The distributed power flow calculation and distributed computation process continues until all necessary parameters at the nodes of interest are determined. At that time, the process for determining optimized solution that meets system objective is initiated.

FIG. 6 also demonstrates supervisory level N virtual subnetwork edge measurements be assigned with values of lower level connected (generically labeled 694) boundary nodes, such as node 696 assigned with values of the node 628 from the lower (JP) supervisory level. The supervisory level N utilizes the distributed state estimation, power flow calculation and computation to determine parameters at its subnetwork head bus 696. The supervisory level N might reinitiate the distributed power flow calculation and computation process at some lower supervisory levels if mismatch at boundary buses exceeds the predefined tolerance. The supervisory level N subnetwork head bus (696) is reported to the next higher supervisory level (N+1) as a virtual grid edge measurement. Based on needs, the higher level supervisor N+1 can consolidate the lower level N supervisors.

The supervisory level N+1 head bus is a boundary bus, providing virtual subnetwork measurements for the higher supervisory level N+2. The structured mapping is maintained until the network head bus is reached.

Figure 7:
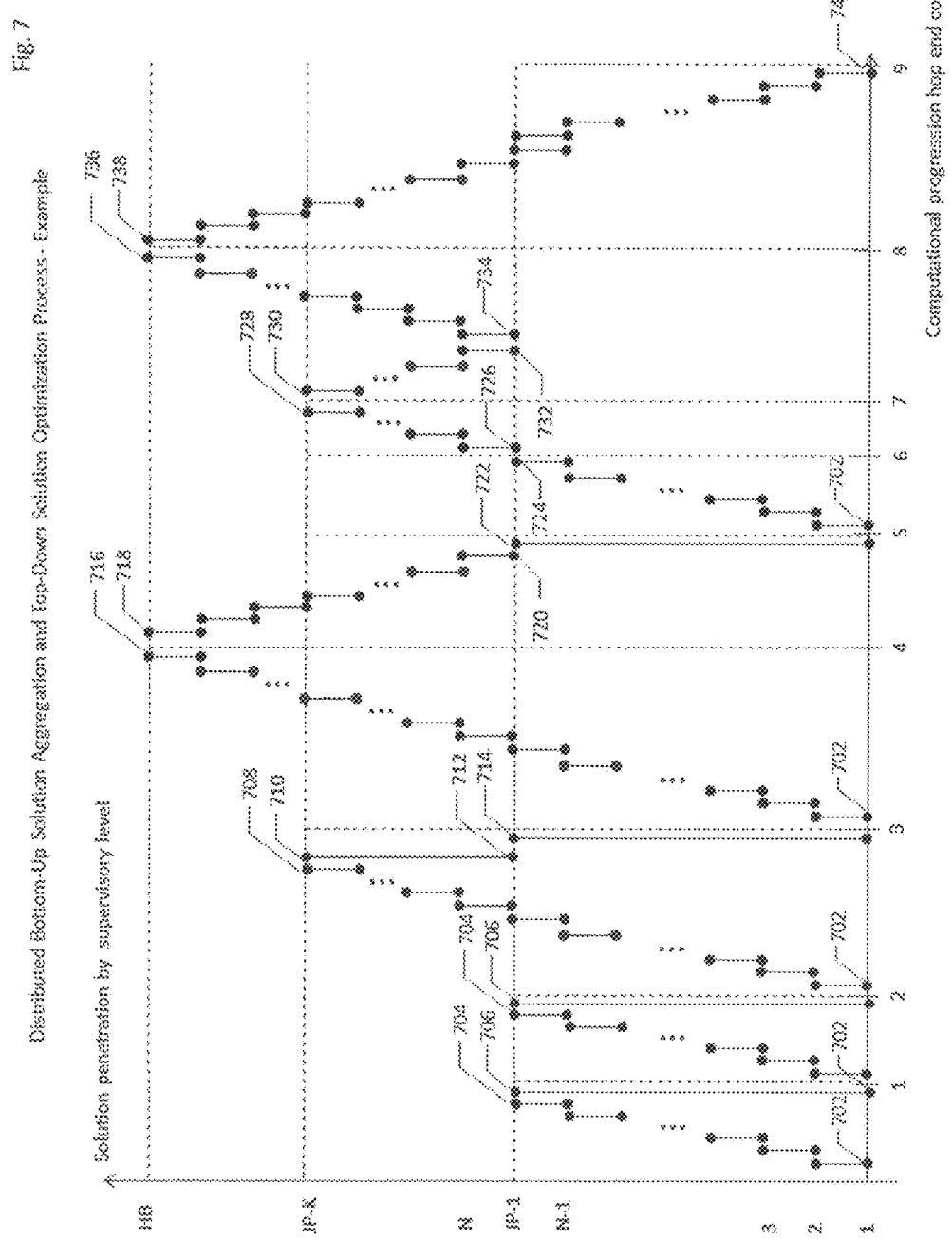
FIG. 7 depicts the distributed bottom-up solution aggregation and distributed top-down solution optimization aggregation routine process in one embodiment of these teachings.

FIG. 7 depicts the distributed bottom-up solution aggregation and distributed top-down solution optimization aggregation routine process, which starts either with acquisition of needed grid edge measurements in leaf subnetworks or with initialization of the distributed optimal solution aggregation process by the appropriate supervisory level if all required node states are known.

The optimization problem is solved for the weighted functions according to attributes that define electrical and non-electrical interaction among the sources and sinks. The attributes include but are not limited to correlation between the sink and the source impedance, voltages at source and sink location, and source and sink offering prices.

FIG. 7 shows the process that starts with the distributed bottom-up solution aggregation process. Electrical and non-electrical parameters for the leaf network that are determined as product of the distributed power flow state estimation, distributed calculation and distributed computation in the leaf subnetworks is reported by the leaf subnetwork supervisor (702) to an appropriate next supervisory level (2), which determines whether to reinitiate distributed state estimation, distributed calculation and distributed computation in any of the subnetworks supervised by lower (e.g. leaf subnetwork) level supervisors.

If switch points present in the subnetwork, the subnetwork bottom-up solution aggregation process is supervised by the junction point supervisor at each switch point. FIG. 7 defines the first level JP supervisory level at performing distributed state estimation and/or calculation at 704. There might be multiple supervisory levels between the supervisory level 1 (leaf subnetworks) and junction point supervisory level. For demonstration purposes, we define level 1 as supervisory level for leaf subnetworks and N−2 additional supervisory levels that aggregate the subnetwork solution to the junction point. Furthermore, there might be multiple junction point supervisory levels with multiple supervisory levels among them. In our example, there are K junction point supervisory levels. FIG. 7 demonstrates the bottom-up solution aggregation reaching the junction Point K supervisory level (708) and Junction Point K supervisory level requesting Junction Point 1 supervisory level to reinitiate (710) backing down the solution bottom-up aggregation process with new instructions for the Junction Point 1 supervisory level, such as different switch configuration on Junction Point 1 supervisory level. Furthermore, FIG. 7 demonstrates an example of the Junction Point 1 supervisory level performing the instructed task (712) and determines (714) to back-down the bottom-up solution aggregation process by initiating one or more (leaf subnetwork) supervisory levels 1 to start the bottom-up solution aggregation with new instructions/measurements in place.

The JP supervisory level proceeds with "as is" or assumed lower level network topology and calculates the aggregated solution error, which manifests as voltage and active/reactive power magnitude differential between the reported values by lower level supervisors and calculated values by the junction supervisor, if such error occurs, the JP supervisor will engage "recipes" (rules) for determining error origin and mitigation of such errors. An example might be that topology on the lower levels is different than what was assumed, which triggers investigation with junction point supervisors on lower levels (710-712), if any. Another example is the junction point supervisor instructions (706, 714) to lower supervisory levels (702) to reinitiate the leaf subnetwork solution (e.g. reconsider pseudo measurements used in distribution state estimation, calculation and computation in leaf subnetworks). A re-initiation of the distributed calculation and computation on lower networks on leaf network supervisory level represents an example of backing down the bottom-up solution aggregation routine.

If solution error on the junction point supervisor level is within the tolerance, the aggregated solution in the form of a virtual measurement is reported to the next level supervisor. The process is continued until the solution at the network head bus is aggregated (716) by the highest supervisory level that we call the network head bus (FIB) supervisory level.

With states at all or selected nodes calculated, the top-down solution optimization process starts (718) with FIB supervisory level initiating the optimization routines based on the energy transaction requests. The HB supervisory level optimization results set targets for the HB reporting supervisory levels, which then determine optimal targets for their supervisory level and/or pass targets to lower supervisory levels.

During the optimization aggregation process, all grid voltages are kept within the allowable range. All line currents are kept below the line ratings. The apparent power transferred through the transformers and energy routing mediums are limited to prevent overload conditions. Also, the local control operating limits (e.g. device reactive power capability) are taken into account.

FIG. 7 demonstrates the top-down distributed optimization process (718) with first top-down optimization computational starting at hop 5. As needed, the supervisory levels might back-up (726, 734) the top-down optimization process for one, few or all higher supervisory levels and/or re-initiate the bottom-up solution aggregation process (720, 722) for one, few or more lower supervisory levels. During the bottom-up solution aggregation process initiated during the top-down optimization process, the supervisor level that initiated the bottom-up solution aggregation (722) evaluates aggregated solution to determine (724) whether the top-down optimization process can proceed or the bottom-up solution aggregation needs to proceed further (backing-up the solution optimization process further). FIG. 7 also demonstrates a supervisory level JP-K stopping (728) the bottom-up solution aggregation process initiated by one of the lower supervisory levels within the top-down optimization process, and continuing (730) with the top-dog, m optimization process. Furthermore, FIG. 7 demonstrates one of supervisory levels deciding to pause the top-down optimization process (732) and invoke the bottom-up solution process (734) that requires resolution on the highest supervisory level HB (736), after which the top-down optimization process continues (738).

In FIG. 7 example, the solution aggregation (SA) and solution optimization (SO) is completed in 9 hop counts. In consecutive order, starting at count 1: SA, SA, SA, SA, SO, SA, SO, and SO. The fifth computation hop represents invoke of solution aggregation within the solution optimization process.

When solution optimization process is complete (740), energy resources selected to participate in the energy transaction are dispatched with appropriate schedules. During transaction, designated supervisory levels perform real-time control and correction (if needed) of energy resources that participate in the energy transaction. A control correction example is a linear controller feedback loop that maintains (sub)network import/export targets. HB supervisory level performs linear control correction based on targeted export/import and calculated (real-time) values. If calculated error is greater than the tolerance, the HB supervisory level issues new (correctional) targets to one or more reporting supervisor levels, which apply identical correctional functions downstream, if needed. Based on the system architecture design and field conditions, a new command for HANs can be either channeled via FIB supervisory level or directly via leaf subnetwork supervisory level.

Figure 8:
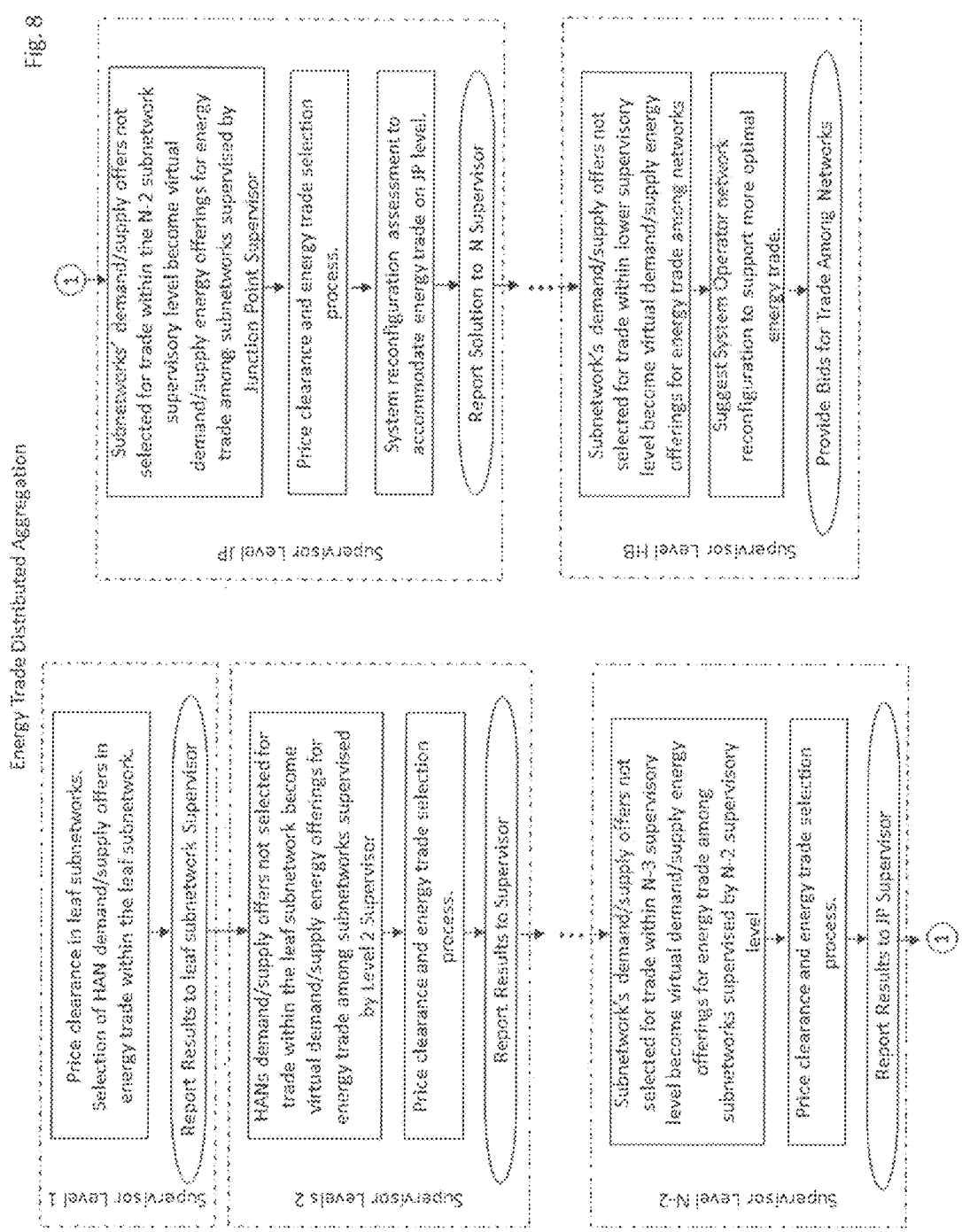
FIG. 8, depicts distributed aggregation of energy trade in one embodiment of these teachings.

FIG. 8 depicts distributed aggregation of energy trade within the subnetwork and among subnetworks interconnected via energy routing mediums. The energy trade price clearance is determined for each subnetwork as part of distributed power flow calculation and distributed computation solution aggregation process. The price clearance and energy trade selection process follows the Network Organization Scheme demonstrated in FIG. 4, in accordance to subnetwork electrical strength. The price clearance could be only an internal process attribute, used by supervisor levels to identify subnetworks with relaxed/stressed conditions. An example is a high price clearance, identifying to supervisory levels that additional energy import to downstream subnetworks is tightly bounded, A (one) utility/public distribution system operator energy buy/sell price for the power subsystem defines the trade area. Therefore, an energy trade area can be as large as the entire power subsystem (e.g. system operator determined LMP pricing at the transmission substation level) or as small as the leaf subnetwork. Within the trade are, HANs can have their energy buy/sell price offering.

As higher level subnetworks represent a strong source for the leaf subnetworks, the price clearance is first executed at the grid edge within each of the leaf subnetworks with offerings from:

(1) utility/public distribution system energy sell/buy price offering to each of the HANs within the leaf network, AND
(2) sell/buy price offering from each of the HAN.

As a result of the leaf subnetwork energy trade clearance, none, some or all HANs are selected for the energy trade within the leaf subnetwork. Those HANs that are not selected for energy trade within the subnetwork are reported to the supervisory levels, which take these unselected bids as energy buy/sell offerings for energy trade among the subnetworks.

JP supervisory level explores switching options for more optimal energy trade. This process requires re-initiation of solution aggregation and optimization process for the proposed topology. If system reconfiguration for sufficient time provides more optimal energy trade, the JP supervisor reports to the next supervisory level (N) reconfiguration opportunity alongside results of the price clearance, energy trade selection and not selected resources with buy/sell price offerings for JP supervisory level.

Following the energy trade clearance, energy trade participating HANs real-time demand/supply is recorded at regular intervals (e.g. 1 min, 5 min, 15 min). Any deviation for the demon/supply energy volume that was cleared for energy trade greater than the tolerance requires re-initiation of the energy trade process for affected subnetworks.

Figure 9:
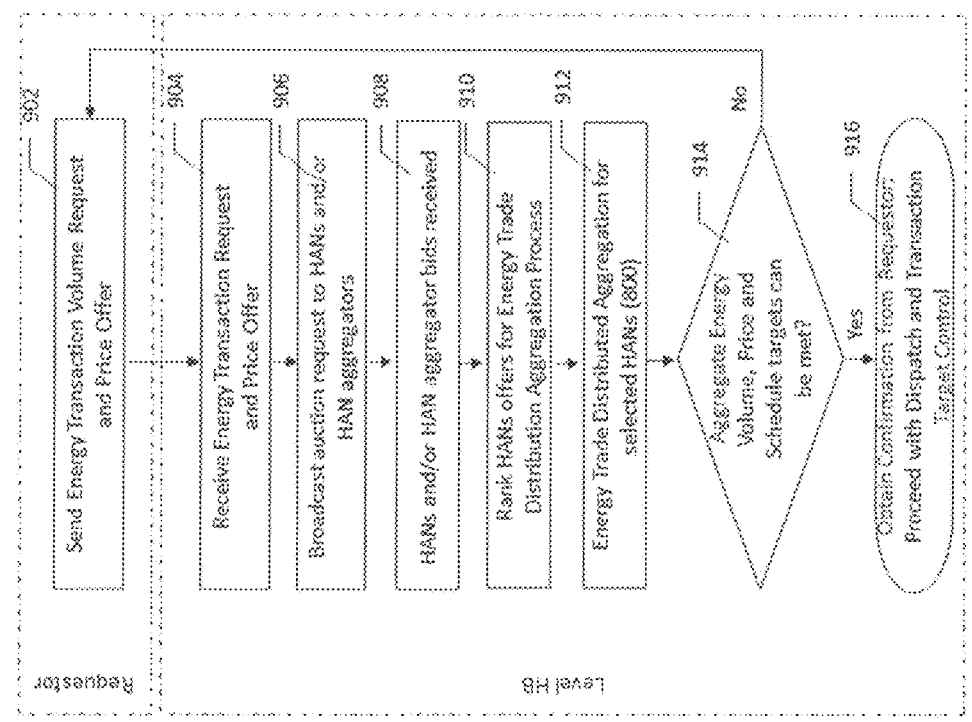
FIG. 9, depicts an auction targeted energy trade process in one embodiment of these teachings.

The energy response auction (e.g. demand reduction, reserve regulation) can be also initiated by the HB supervisory level on behalf of the requestor utility/system operator or market participant(s). The requester submits desired energy and offered price (902). HB supervisor receives the request (904) level broadcasts auction (906) offer, requesting $ per energy unit (kVA, kW and/or kVA)) bid from HANs and/or HAN aggregators. Once the bids are received (908) from some/all HANs, the energy trade process starts with bids ranking (910). The ranking process is a result of the distributed bottom-up aggregation and top-down solution optimization process (demonstrated in FIG. 7) followed by the energy trade distributed aggregation process (demonstrated in FIG. 8), according to which initial auction participants are selected, as described in FIG. 9.

The distributed aggregation of energy trade determines total volume of energy, time interval price and schedule to be offered to the requestor. If the requestor's volume, price and schedule targets for energy transaction (912) can be met, the HB supervisor level obtains confirmation from the requestor, delivers contractual instructions to HANs and/or HAN aggregators for all HANs selected to participate in the auction, and issues targets to supervisors to monitor and control the energy agreed trade transaction (916). If the requestor's volume, price and schedule targets for energy transaction (912) cannot be met (914), HB supervisory level submits energy volume, price and schedule offer to the requestor and waits for acceptance or new energy volume, price and schedule request from the requestor.

In one or more embodiments, the aggregation/supervision system of these teachings includes a number of first level supervisory subsystems and a number of second level supervisory subsystems. Each first level supervisory subsystem is configured to (a) acquire measurements originating from the number of sensors distributed up to an edge of s first level network, the measurements comprising current, voltage, active power, reactive power and data of interconnectivity, the data not including data from utility operational networks, the utility operational networks including substations and circuit switches, (b) obtain observability metrics from the measurements, (c) determine whether the first level network is observable, (d) determine, when the first level network is not observable, whether additional measurements are available, (e) acquire, when additional measurements are available, the additional measurements and repeating steps (b)-(d), (f) provide, when additional measurements are not available, pseudo-measurements based on recently acquired measurements in order to render the first level network observable, (g) perform, when the first level network is observable, state estimation, (h) detect and identify, after the state estimation, bad data, (i) provide a determination, resulting from the had data, of whether a new state estimation is required, (j) repeat steps (a)-(i) when the new state estimation is required, (k) determine, when the new state estimation is not required, distributed power flow for the first level network, receive distributed power flow the first level network, determine a price clearance for the first level network, wherein determining the price clearance comprises using utility/public distribution system energy sell/buy price offerings for each subnetworks within the first level network and sell/buy price offerings for each subnetwork, determine whether to recalculate distributed power flow for the first level network, determine whether to reinitiate a power flow solution for the first level network, and determine whether to request dispatch of the first level network. Each second level supervisory subsystem is configured to receive the distributed power flow for the first level network from at least two of the number of first level supervisory subsystems, determine from the distributed power flow for at least two first level networks power flow parameters at a node corresponding to said each second level supervisory subsystems, and decide to reinitiate distributed power flow calculations, the decision of whether to reinitiate distributed power flow calculation based on whether errors exceed a predetermined tolerance.

In one instance, the aggregation/supervision system of these teachings also includes a junction point supervisory subsystem, a junction point being a network logic point. The junction point supervisory subsystem is configured to receive distributed power flow information from two lower level supervisory subsystems, each lower-level supervisory subsystem being one of an intermediate level supervisory subsystem or a second level supervisory subsystem, perform state estimation in order to reduce errors, and analyze grid edge measurements, the grid edge measurements comprising voltage fluctuations on both sides of switch nodes.

In one instance, each first level supervisory subsystem from the number of first level supervisory subsystems is further configured to select demand/supply offers for some subnetworks for energy trade within the first level network, and report results of selection to a second level supervisory subsystem.

In another instance, each second level supervisory subsystem from the number of first level supervisory subsystems is further configured to use demand/supply offers for subnetwork not selected for energy trade within the first level network as virtual demand/supply energy offerings for energy trade within subnetworks reporting to the second level supervisory subsystem, perform price clearance and energy trade selection for the subnetworks reporting to the second level supervisory subsystem, and report results of the energy trade selection to a higher level supervisory subsystem.

In another embodiment, the aggregation/supervision of these, teachings also includes a highest level supervisory subsystem; the highest level supervisory subsystem configured to use demand/supply offers for subnetwork not selected for energy trade within subnetworks reporting to lower supervisory level subsystems, as virtual demand/supply energy offerings for energy trade among networks, and provide bids for trade among the networks.

In one instance, the highest level supervisory subsystem is further configured to receive an energy transaction volume request and price offer, broadcast energy transaction request to subnetworks and subnetwork aggregators, receive bids from subnetworks and subnetwork aggregators, rank bids for energy trade distribution aggregation, obtain a distributed energy trade aggregation, and obtain, when the energy transaction volume request and price offer can be met, a confirmation and proceed with dispatch and transaction target control, or submit, when the energy transaction volume request some price offer can not be met, the distributed energy trade aggregation to requester.

Conventional methods require use of utility operational data network (e.g. SCADA) alone or in combination with utility informational data network (e.g. smart meter data). In either case, existing methods are dependent on operational data network. The methods and systems of these teachings use the intelligence available in the information data network, and avoid dependence on the utility system operator operational data network.

Figure 10:
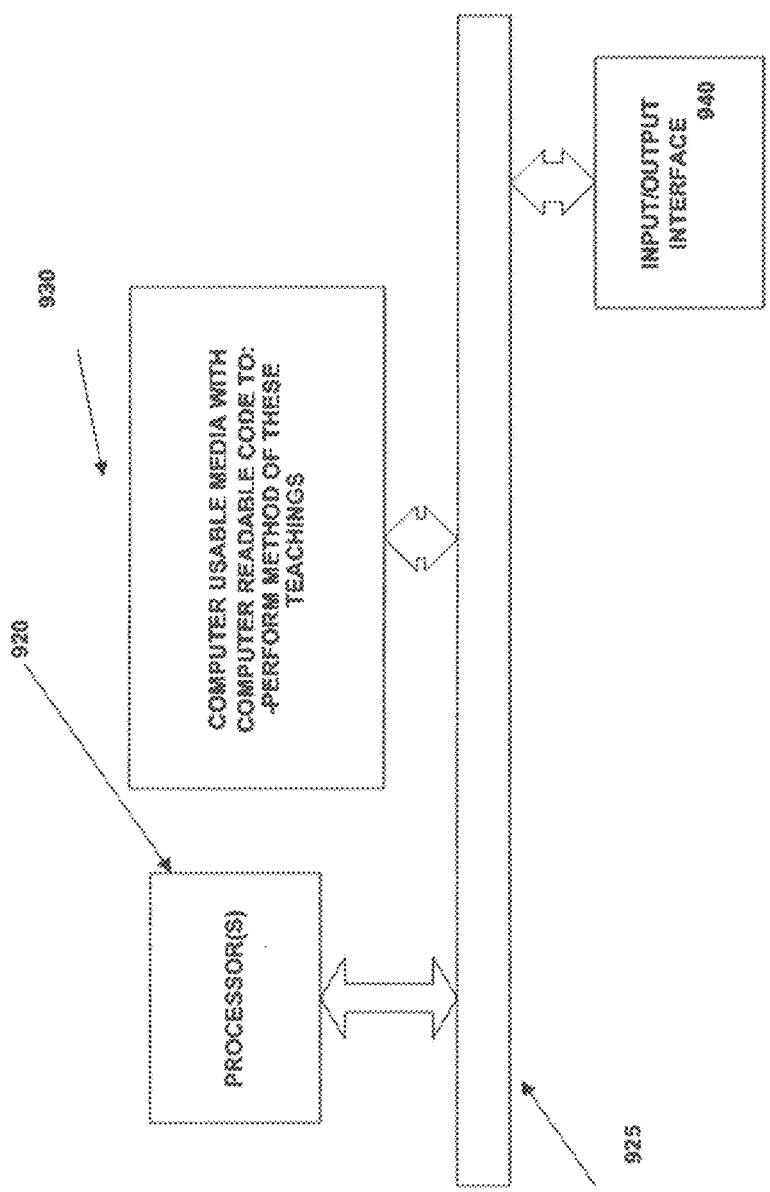
FIG. 10 shows an embodiment of components in embodiments of the system of these teachings.

In one embodiment, components of the aggregation/supervision of these teachings are configured by including one or more processors that execute computer readable code, embodied in computer usable media, in order to perform the actions recited hereinabove. FIG. 10 shows certain embodiments of the components of the aggregation/supervision of these teachings. Referring to FIG. 10, in the embodiment shown therein, one or more processors 920 are operatively connected to computer usable media 930, where the computer usable media nine said he has computer readable code embodied therein that when executed by the one or more processors 920 causes the one or more processors to perform the desired actions. An input output interface 940 is also operatively connected to the one or more processors, enabling the receiving of information from or transmitting of information to another component. The apparent connection is performed by a computer connection component 925 (such as a computer bus).

The following is a disclosure by way of example of a device configured to execute functions (hereinafter referred to as computing device) which may be used with the presently disclosed subject matter. The description of the various components of a computing device is not intended to represent any particular architecture or manner of interconnecting the components. Other systems that have fewer or more components may also be used with the disclosed subject matter. A communication device may constitute a form of a computing device and may at least include a computing device. The computing device may include an inter-connect (e.g., bus and system core logic), which can interconnect such components of a computing device to a data processing device, such as a processor(s) or microprocessor(s), or other form of partly or completely programmable or pre-programmed device, e.g., hard wired and or application specific integrated circuit (ASIC) customized logic circuitry, such as a controller or microcontroller, a digital signal processor, or any other form of device that can fetch instructions, operate on pre-loaded/pre-programmed instructions, and/or followed instructions found in hardwired or customized circuitry to carry out logic operations that, together, perform steps of and whole processes and functionalities as described in the present disclosure.

In this description, various functions, functionalities and/or operations may be described as being performed by or caused by software program code to simplify description. However, those skilled in the art will recognize what is meant by such expressions is that the functions result from execution of the program code/instructions by a computing device as described above, e.g., including a processor, such as a microprocessor, microcontroller, logic circuit or the like. Alternatively, or in combination, the functions and operations can be implemented using special purpose circuitry, with or without software instructions, such as using Application-Specific Integrated Circuit (ASIC) or Field-Programmable Gate Array (FPGA), which may be programmable, partly programmable or hard wired. The application specific integrated circuit ("ASIC") logic may be such as gate arrays or standard cells, or the like, implementing customized logic by metallization(s) interconnects of the base gate array ASIC architecture or selecting and providing metallization(s) interconnects between standard cell functional blocks included in a manufacturer's library of functional blocks, etc. Embodiments can thus be implemented using hardwired circuitry without program software code/instructions, or in combination with circuitry using programmed software code/instructions.

Thus, the techniques are limited neither to any specific combination, of hardware circuitry and software, nor to any particular tangible source for the instructions executed by the data processor(s) within the computing device. While some embodiments can be implemented in fully functioning computers and computer systems, various embodiments are capable of being distributed as a computing device including, e.g., a variety of forms and capable of being applied regardless of the particular type of machine or tangible computer-readable media used to actually effect the performance of the functions and operations and/or the distribution of the performance of the functions, functionalities and/or operations.

The interconnect may connect the data processing device to define logic circuitry including memory. The interconnect may be internal to the data processing device, such as coupling a microprocessor to on-board cache memory or external (to the microprocessor) memory such as main memory, or a disk drive or external to the computing device, such as a remote memory, a disc farm or other mass storage device, etc. Commercially available microprocessors, one or more of which could be a computing device or part of a computing device, include a PA-RISC series microprocessor from Hewlett-Packard Company, an 80×86 or Pentium series microprocessor from Intel Corporation, a PowerPC microprocessor from IBM, a Sparc microprocessor from Sun Microsystems, Inc. or a 68xxx series microprocessor from Motorola Corporation as examples.

The inter-connect in addition to interconnecting such as microprocessor(s) and memory may also interconnect such elements to a display controller and display device, and/or to other peripheral devices such as input/output (I/O) devices, e.g., through an input/output controller(s). Typical I/O devices can include a mouse, a keyboard(s), a modem(s), a network interface(s), printers, scanners, video cameras and other devices which are well known in the art. The inter-connect may include one or more buses connected to one another through various bridges, controllers and/or adapters. In one embodiment the I/O controller includes a USB (Universal Serial Bus) adapter for controlling USB peripherals, and/or an IEEE-1394 bus adapter for controlling IEEE 1394 peripherals.

The memory may include any tangible computer-readable media, which may include but are not limited to recordable and non-recordable type media such as volatile and non-volatile memory devices, such as volatile RAM (Random Access Memory), typically implemented as dynamic RAM (DRAM) which requires power continually in order to refresh or maintain the data in the memory, and non-volatile ROM (Read Only Memory), and other types of non-volatile memory, such as a hard drive, flash memory, detachable memory stick, etc. Non-volatile memory typically may include a magnetic hard drive, a magnetic optical drive, or an optical drive (e.g., a DVD RAM, a CD ROM, a DVD or a CD), or other type of memory system which maintains data even after power is removed from the system.

A server could be made up of one or more computing devices. Servers can be utilized, e.g., in a network to host a network database, compute necessary variables and information from information in the database(s), store and recover information from the database(s), track information and variables, provide interfaces for uploading and downloading information and variables, and/or sort or otherwise manipulate information and data from the database(s). In one embodiment a server can be used in conjunction with other computing devices positioned locally or remotely to perform certain calculations and other functions as may be mentioned in the present application.

At least some aspects of the disclosed subject matter can be embodied, at least in part, utilizing programmed software code/instructions. That is, the functions, functionalities and/or operations techniques may be carried out in a computing device or other data processing system in response to its processor, such as a microprocessor, executing sequences of instructions contained in a memory, such as ROM, volatile RAM, non-volatile memory, cache or a remote storage device. In general, the routines executed to implement the embodiments of the disclosed subject matter may be implemented as part of an operating system or a specific application, component, program, object, module or sequence of instructions usually referred to as "computer programs," or "software." The computer programs typically comprise instructions stored at various times in various tangible memory and storage devices in a computing device, such as in cache memory, main memory, internal or external disk drives, and other remote storage devices, such as a disc farm, and when read and executed by a processor(s) in the computing device, cause the computing device to perform a method(s), e.g., process and operation steps to execute an element(s) as part of some aspects) of the method(s) of the disclosed subject matter.

A tangible machine readable medium can be used to store software and data that, when executed by a computing device, causes the computing device to perform a method(s) as may be recited in one or more accompanying claims defining the disclosed subject matter. The tangible machine readable medium may include storage of the executable software program code/instructions and data in various tangible locations, including for example ROM, volatile RAM, non-volatile memory and/or cache. Portions of this program software code/instructions and/or data may be stored in any one of these storage devices. Further, the program software code/instructions can be obtained from remote storage, including, e.g., through centralized servers or peer to peer networks and the like. Different portions of the software program code/instructions and data can be obtained at different times and in different communication sessions or in a same communication session.

The software program code/instructions and data can be obtained in their entirety prior to the execution of a respective software application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a single machine readable medium in entirety at any particular instance of time.

In general, a tangible machine readable medium includes any tangible mechanism that provides (i.e., stores) information in a form accessible by a machine (i.e., a computing device, which may be included, e.g., in a communication device, a network device, a personal digital assistant, a mobile communication device, whether or not able to download and run applications from the communication network, such as the Internet, e.g., an I-phone, Blackberry, Droid or the like, a manufacturing tool, or any other device including a computing device, comprising one or more data processors, etc.

Although these teachings have been described with respect to various embodiments, it should be realized these teachings are also capable of a wide variety of further and other embodiments within the spirit and scope of the appended claims.

What is claimed is:

1. A method of obtaining a power flow solution for a first level network including distributed energy resources, the method comprising:
 (a) acquiring measurements originating from a number of sensors distributed up to an edge of the first level network; the measurements comprising current, voltage, active power, reactive power and data of interconnectivity; the data not including data from utility operational networks, the utility operational networks including substations and circuit switches;
 (b) obtaining observability metrics from the measurements;
 (c) determining whether the first level network is observable;
 (d) determining, when the first level network is not observable, whether additional measurements are available;

(e) acquiring, when additional measurements are available, the additional measurements and repeating steps (b)-(d);

(f) receiving, when additional measurements are not available, pseudo-measurements based on recently acquired measurements in order to render the first level network observable; the pseudo-measurements being defined by a first level supervisory subsystem;

(g) performing, when the first level network is observable, state estimation;

(h) detecting and identifying, after the state estimation, bad data;

(i) receiving a determination, resulting from the had data, of whether a new state estimation is required; determination of whether a new state estimation is required is performed by the first level supervisory subsystem;

(j) repeating steps (a)-(i) when the new state estimation is required; and (k) determining, when the new state estimation is not required, distributed power flow for the first level network.

2. A method for aggregation of a network, the network comprising a number of first level networks, each first level network including distributed energy resources, the method comprising:

receiving, at each of a number of first level supervisory subsystems, distributed power flow for a first level network, the distributed power flow obtained by the method of claim 1;

determining, at said each of the number of first level supervisory subsystems, a price clearance for the first level network;

determining, at said each of the number of first level supervisory subsystems, whether to recalculate distributed power flow for the first level network;

determining, at said each of the number of first level supervisory subsystems, whether to reinitiate a power flow solution for the first level network; and determining, at said each of the number of first level supervisory subsystems, whether to request dispatch of the first level network.

3. The method of claim 2 further comprising:

receiving, at one of a number of second level supervisory subsystems, the distributed power flow for the first level network from at least two of the number of first level supervisory subsystems;

determining, from the distributed power flow for at least two first level networks, at said one of the number of second level supervisory subsystems, power flow parameters at a node corresponding to said one of the number of second level supervisory subsystems;

deciding, at said one of the number of second level supervisory subsystems, whether to reinitiate distributed power flow calculations, decision of whether to reinitiate distributed power flow calculation based on whether errors exceed a predetermined tolerance.

4. The method of claim 3 further comprising:

providing, to a junction point supervisory subsystem, distributed power flow information from two lower level supervisory subsystems; each lower-level supervisory subsystem being one of an intermediate level supervisory subsystem or a second level supervisory subsystem; a junction point being a network logic point;

performing, at the junction point supervisory subsystem, state estimation in order to reduce errors; and analyzing, at the junction point supervisory subsystem, grid edge measurements; the grid edge measurements comprising voltage fluctuations on both sides of switch nodes.

5. The method of claim 2 wherein determining the price clearance comprises using utility/public distribution system energy sell/buy price offerings for each subnetwork within the first level network and sell/buy price offerings for each subnetwork.

6. The method of claim 5 further comprising:

selecting demand/supply offers for some subnetworks for energy trade within the first level network; and reporting results of selection to a second level supervisory subsystem.

7. The method of claim 6 further comprising:

using demand/supply offers for subnetwork not selected for energy trade within the first level network as virtual demand/supply energy offerings for energy trade within subnetworks reporting to the second level supervisory subsystem;

performing price clearance and energy trade selection for the subnetworks reporting to the second level supervisory subsystem; and reporting results of the energy trade selection to a higher level supervisory subsystem.

8. The method of claim 7 wherein the results are reported to a highest level supervisory subsystem.

9. The method of claim 8 further comprising:

using demand/supply offers for subnetwork not selected for energy trade within subnetworks reporting to lower supervisory level subsystems, as virtual, demand/supply energy offerings for energy trade among networks; and providing bids for trade among the networks.

10. The method of claim 9 further comprising:

receiving, at the highest level supervisory subsystem, an energy transaction volume request and price offer;

broadcasting, at the highest level supervisory subsystem, energy transaction request to subnetworks and subnetwork aggregators;

receiving, at the highest level supervisory subsystem, bids from subnetworks and subnetwork aggregators;

ranking, at the highest level supervisory subsystem, bids for energy, trade distribution aggregation;

obtaining, at the highest level supervisory subsystem, a distributed energy trade aggregation;

obtaining, at the highest level supervisory subsystem, when the energy transaction volume request and price offer can be met, a confirmation and proceeding with dispatch and transaction target control; and submitting, at the highest level supervisory subsystem, when the energy transaction volume request and price offer cannot be met, the distributed energy trade aggregation to requester.

11. An aggregation/supervision system comprising:

a number of first level supervisory subsystems; each first level supervisory subsystem from the number of first level supervisory subsystems configured to:

(a) acquire measurements from a number of sensors distributed up to an edge of a first level network; the measurements comprising current, voltage, active power, reactive power and data of interconnectivity; the data not including data from utility operational networks, the utility operational networks including substations and circuit switches;

(b) obtain observability metrics from the measurements;

(c) determine whether the first level network is observable;
(d) determine, when the first level network is not observable, whether additional measurements are available;
(e) acquire, when the additional measurements are available, the additional measurements and repeating steps (b)-(d);
(f) provide, when the additional measurements are not available, pseudo-measurements based on recently acquired measurements in order to render the first level network observable;
(g) perform, when the first level network is observable, state estimation;
(h) detect and identify, after the state estimation, bad data;
(i) provide a determination, resulting from the bad data, of whether a new state estimation is required;
(j) repeat steps (a)-(i) when the new state estimation is required;
(k) determine, when the new state estimation is not required, distributed power flow for the first level network;
receive distributed power flow the first level network;
determine a price clearance for the first level network; Wherein determining the price clearance comprises using utility/public distribution system energy sell/buy price offerings for each subnetworks within the first level network and sell/buy price offerings for each subnetwork;
determine whether to recalculate distributed power flow for the first level network;
determine whether to reinitiate a power flow solution for the first level network; and
determine whether to request dispatch of the first level network;
a number of second level supervisory subsystems; each second level supervisory subsystem from the number of second level supervisory subsystems configured to:
receive the distributed power flow for the first level network from at least two of the number of first level supervisory subsystems;
determine from the distributed power flow for at least two first level networks power flow parameters at a node corresponding to said each second level supervisory subsystems;
decide to reinitiate distributed power flow calculations, decision of whether to reinitiate distributed power flow calculation based on whether errors exceed a predetermined tolerance; and
report results of the distributed power flow to a higher level supervisory subsystem.

12. The aggregation/supervision system of claim 11 further comprising:
a junction point supervisory subsystem; a junction point being a network logic point; the junction point supervisory subsystem configured to:
receive distributed power flow information from two lower level supervisory subsystems; each lower-level supervisory subsystem being one of an intermediate level supervisory subsystem or a second level supervisory subsystem;
perform state estimation in order to reduce errors; and
analyze grid edge measurements; the grid edge measurements comprising voltage fluctuations on both sides of switch nodes.

13. The aggregation/supervision system of claim 12 wherein said each first level supervisory subsystem from the number of first level supervisory subsystems is further configured to:
select demand/supply offers for some subnetworks for energy trade within the first level network; and
report results of selection to a second level supervisory subsystem.

14. The aggregation/supervision system of claim 13 wherein said each second level supervisory subsystem from the number of first level supervisory subsystems is further configured to:
use demand/supply offers for subnetwork not selected for energy trade within the first level network as virtual demand/supply energy offerings for energy trade within subnetworks reporting to the second level supervisory subsystem;
perform price clearance and energy trade selection for the subnetworks reporting to the second level supervisory subsystem; and
report results of the energy trade selection to a higher level supervisory subsystem.

15. The aggregation/supervision system of claim 14 further comprising:
a highest level supervisory subsystem; the highest level supervisory subsystem configured to:
use demand/supply offers for subnetwork not selected for energy trade within subnetworks reporting to lower supervisory level subsystems, as virtual demand/supply energy offerings for energy trade among networks; and
provide bids for trade among the networks.

16. The aggregation/supervision system of claim 15 wherein the highest level supervisory subsystem is further configured to:
receive an energy transaction volume request and price offer;
broadcast energy transaction request to subnetworks and subnetwork aggregators;
receive bids from subnetworks and subnetwork aggregators;
rank bids for energy trade distribution aggregation;
obtain a distributed energy trade aggregation;
obtain, when the energy transaction volume request and price offer can be met, a confirmation and proceeding with dispatch and transaction target control; and
submit, when the energy transaction volume request and price offer cannot be met, the distributed energy trade aggregation to requester.

* * * * *